C. L. REISH.
TIRE CLAMP.
APPLICATION FILED MAY 31, 1919.
1,345,957.
Patented July 6, 1920.
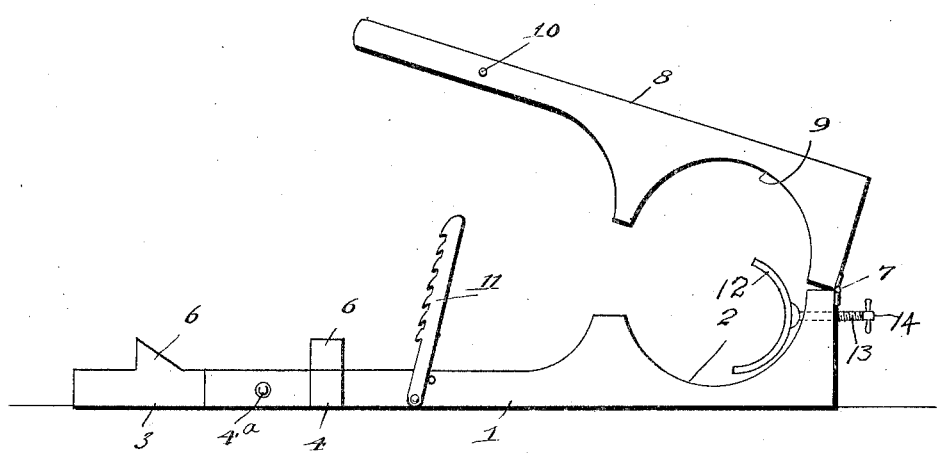
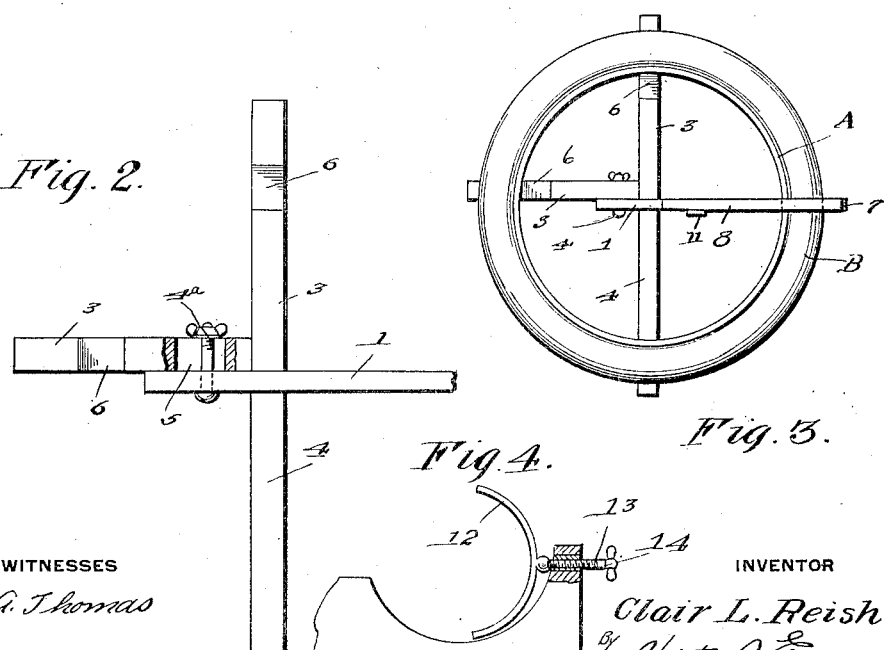
WITNESSES
R. G. Thomas
INVENTOR
Clair L. Reish
By Victor J. Evans
Atty.

UNITED STATES PATENT OFFICE.

CLAIR L. REISH, OF PITTSBURGH, PENNSYLVANIA.

TIRE-CLAMP.

1,345,957. Specification of Letters Patent. Patented July 6, 1920.

Application filed May 31, 1919. Serial No. 301,018.

*To all whom it may concern:*

Be it known that I, CLAIR L. REISH, a citizen of the United States, residing at Pittsburgh, in the county of Allegheny and State of Pennsylvania, have invented new and useful Improvements in Tire-Clamps, of which the following is a specification.

This invention relates to a clamp and more particularly to a tire casing clamp and has for its primary object to provide a clamp of simple inexpensive construction by means of which the diameter of a tire casing may be readily contracted and held mechanically in its contracted condition.

An object of the invention is to provide a clamp of a construction that certain manual operations may be dispensed with when wrapping a tire casing.

Besides the above my invention is distinguished in a manner of constructing and associating the parts so that different size casings can be accommodated.

With these and other objects in view the invention will be better understood from the following detailed description taken in connection with the accompanying drawing wherein:

Figure 1 is a side elevation of the invention.

Fig. 2 is a top plan view of a portion thereof.

Fig. 3 is a diagrammatic view showing the tire in place.

Fig. 4 is a detailed view showing the use of an adjustable rest.

Again referring to the drawing illustrating one of the many forms in which my invention may be constructed, the numeral 1 designates a base constructed of any suitable material and if necessary this material may be of hard wood such as oak to reduce the expense thereof and thereby provide a very inexpensive form of clamp.

The base 1 is provided with an arcuate depression 2 for the reception of the tire casing. Coöperating with the base are supports 3 and 4, certain of which are adjustably connected to the base 1 by a thumb screw 4ª fixed to the base and coöperating with the slot 5 in the support as clearly shown in Fig. 2. Thus it will be seen that different size casings may be accommodated. The tire casing rests directly upon the supports and for the purpose of preventing movement of the tire casing when acted upon, the supports 3 are provided with projections 6 that engage the inner peripheral surface of the tire. The base 1 is bolted to any suitable foundation or table.

Hinged to the base 1 as indicated at 7 is a handle member 8 having an arcuate depression 9 coöperating with the arcuate depression 2 so that the outer surface of the tire casing, at a predetermined point, may be effectively clamped and contracted. The handle member is provided with a pin 10 adapted to adjustably coöperate with any suitable form of catch 11 connected to the base 1.

In the operation of my invention as clearly shown in Fig. 3, a tire casing is arranged upon the supports with a portion arranged in the depression 2. Upon moving the handle member toward the base member it will be seen that a portion of the tire casing will be contracted thereby bringing the clencher ribs A into contact with each other at this point. When this takes place the catch 11 will engage the pin 10 for holding the tire casing in this position. At this point a few wrappings of cloth or other material is applied at point B for holding this portion of the tire casing in contracted condition. After this takes place the handle member 8 is raised and the tire casing given a slight circumferential movement so that a portion of the casing spaced from point B, may be clamped and contracted so that the strip of cloth may be wrapped around the tire casing in a direction toward the handle 8.

It may be advantageous in practice to adjust the size of the depression 2 so as to accommodate different size tires and for this purpose I have shown a rest 12 of an arcuate formation so as to directly engage the casing and be adjustably supported by the base 1 by means of a screw 13 that may be operated in any suitable manner such as by means of a handle 14.

It is of course to be understood that the invention may be constructed in various other manners than shown and the parts associated in other manners therefore I do not desire to be limited in any manner except as set forth in the claims hereunto appended.

Having described my invention, what I claim is:

1. A tire clamp comprising a base constructed to engage a predetermined portion of the periphery of a tire casing, supports adjustably associated with the base for supporting spaced portions of the tire casing, a handle member hinged to the base for contracting the diameter of the casing and a catch connected to the base and adapted to engage said handle member for holding the same in operative position.

2. A tire clamp comprising a base having a depression to engage a predetermined portion of the periphery of a tire casing, supports adjustably associated with the base for supporting spaced portions of the tire casing, a handle member hinged to the base adapted when moved in one direction to coöperate with the base for contracting the diameter of the casing, a catch connected to the base and adapted to engage said handle member for holding the same in operative position, and an adjustable rest coöperating with the base member for controlling the size of said depression.

In testimony whereof I affix my signature.

CLAIR L. REISH.